United States Patent [19]
Polak

[11] 3,917,458
[45] Nov. 4, 1975

[54] GAS FILTRATION SYSTEM EMPLOYING A FILTRATION SCREEN OF PARTICULATE SOLIDS

[75] Inventor: Zednek Polak, Montreal, Canada

[73] Assignees: Frank S. Nicoll, Jr., Owings Mills, Md.; Zednek Polak, Montreal, Canada; a part interest to each

[22] Filed: July 21, 1972

[21] Appl. No.: 273,913

[52] U.S. Cl............... 23/262; 23/277 C; 55/99; 55/267; 55/316; 55/390; 55/414; 55/418; 55/474; 110/8 A; 110/119
[51] Int. Cl.[2]. B01D 23/12; B01D 45/12; F23C 9/04
[58] Field of Search............ 110/8 R, 8 A, 8 B, 8 C, 110/119; 55/77, 79, 344, 98, 99, 418, 34, 60, 316, 387, 517, 390, 471, 474, 479, DIG. 41, DIG. 34, 527, 510, 388, 389, 414, 512; 23/277 R, 277 C, 278, 288 S, 288 D, 262

[56] References Cited
UNITED STATES PATENTS

| | | | |
|---|---|---|---|
| 746,256 | 12/1903 | Baggaley | 55/DIG. 41 |
| 1,570,869 | 1/1926 | Thomson et al. | 55/99 |
| 1,702,311 | 2/1929 | Pantenberg | 55/79 X |
| 1,820,026 | 8/1931 | Kuenhold | 55/418 |
| 1,895,601 | 1/1933 | Beuthner | 55/79 |
| 2,203,685 | 6/1940 | Kaufman | 55/388 X |
| 2,629,459 | 2/1953 | Hammond | 55/527 |
| 2,632,527 | 3/1953 | McBride et al | 55/344 |
| 2,750,681 | 6/1956 | Berry | 23/288 S |
| 3,162,516 | 12/1964 | Dwyer | 55/98 |
| 3,433,218 | 3/1969 | VonWiesenthal | 23/277 C |
| 3,435,593 | 4/1969 | Nordone | 55/474 |
| 3,541,762 | 11/1970 | Ramaswami et al. | 55/98 X |
| 3,668,833 | 6/1972 | Cahill, Jr. | 110/8 A |
| 3,685,262 | 8/1972 | Kressley | 55/474 X |
| 3,706,182 | 12/1972 | Sargent | 55/DIG. 41 |
| 3,706,533 | 12/1972 | Brewer | 23/277 C |
| 3,770,388 | 11/1973 | Zenz | 55/96 X |

FOREIGN PATENTS OR APPLICATIONS

| | | | |
|---|---|---|---|
| 457,430 | 3/1928 | Germany | 55/474 |
| 2,004,966 | 3/1970 | Germany | 55/99 |

Primary Examiner—Frank W. Lutter
Assistant Examiner—N. Greenblum
Attorney, Agent, or Firm—Sughrue, Rothwell, Mion, Zinn & Macpeak

[57] ABSTRACT

One or more fluidized filtration screens are created by sets of closely spaced, oppositely inclined louvers supporting particulate filter matter therebetween. Baffle members control the flow of gas across and through the fluidized filtration screen. The outlet louver angle is closely controlled to insure maximum filtration efficiency at relatively high gas velocity. Modular assemblies permit filter size variation matching gas flow rate and filtration loads.

7 Claims, 12 Drawing Figures

GAS FILTRATION SYSTEM EMPLOYING A FILTRATION SCREEN OF PARTICULATE SOLIDS

BACKGROUND OF THE INVENTION

1. Field of the Invention

This invention relates to gas filtration systems of the dry scrubber type and, more particularly, to industrial and commercial gas filtration systems employing one or more fluidized particulate matter filtration screens.

2. Description of the Prior Art

Gas filtration systems in the past have attempted to employ dry scrubbers constituted by a fluidized filtration screen consisting of particulate matter in the form of a porous screen disposed across the path of the gases to be purfied. One type of such gas filter is set forth in U.S. Pat. No. 930,947 to Thomas A. Edison. In the referred to patent, sets of spaced oppositely inclined louvers define a vertical passage or filtration zone between louvers, with the louvers supporting pulverent or granular material presenting innumerable minute, tortuous channels through which the gas to be filtered passes and wherein, in turn, the micron sized solid particles carried by the gas impinge on the edges of particulate matter defining the filter during passage. Such filters are characterized by a "fluidized filtration zone" defined by the particulate matter captured and held between the oppositely directed oblique or inclined louvers. Normally, the pulverent material is gravity deposited between the upper louvers and falls between the grouped louvers towards the bottom of the louver array.

In practice, it is difficult to produce a dry scrubber or gas filtration system which effectively removes solid particles within a high velocity large flow gas stream, since the gas stream to be purified, impinges on the particulate matter, making up the fluidized filtration screen to greater or lesser extents depending upon the location of the gas inlet and outlet relative to the filtration screen. Gases impinging on the particulate matter at high velocity, and at a given localized area, tend to blow the particulate matter into the gas stream on the discharge side, thus destroying the filtration capability of the particulate matter and in fact adding to contamination of the gas rather than removing contaminant solids. Further, even where the fluidized filtration screen is unaffected by the impingement of the moving gases, impingement takes place at localized areas within the particulate matter filter. This highly contaminates that portion of the filter closest to the major impact area of the gas stream on the inlet side, while virtually leaving other areas of the filtration screen contaminant free. The fluidized filtration apparatus of the prior art is also essentially unchangeable, that is, the construction of the same has not been achieved with the thought in mind of application to gas flows which may fluctuate greatly in terms of CFM and contamination loads.

SUMMARY OF THE INVENTION

The present invention is directed to an improved fluidized filtration apparatus particularly applicable to pollution control in the industrial field while permitting incinerators to operate in commercial offices and apartment buildings, due to its capacity for complete removal of polutants prior to discharge of the flue gases emanating from the incinerator itself. The invention is particularly directed to single or multiple fluidized filtration screens in which the filter provides maximum efficiency in terms of particle removal from the gas without compromising the high flow rates of the gases through the filtration means. The filter is constructed to prevent the particulate filter media from being blown out of the discharge louvers even at relatively high gas velocities. Means are provided both on the inlet and discharge sides of the fluidized filtration screen to insure uniform distribution of the gas over the complete surface area of the filter. The fluidized filtration apparatus is constructed in modular terms to permit ready expansion in the surface area of the fluidized filtration screen or screens to meet increasing gas flow rates. The apparatus is, further, characterized by suction of the contaminant carying gas through the screen such that the particle free gas contacts the blower or fan downstream of the filter with low abrasion to the fan blades or blower.

The particulate filter material preferably comprises chrome ore or similar material such as crushed granite in the form of sharp edge crystals of 125 to 1500 microns in size.

The gas filtration system has application to an incinerator where a booster burner just downstream of the incinerator employs a flame which impinges directly on combustible matter of large size which is blocked from passing to the filters by a metal coil whose loops are spaced one-eighth inch apart, and which lies at right angles and intersects the duct directing combustion gas from the incinerator to the coarse filter.

BRIEF DESCRIPTION OF THE DRAWINGS

FIG. 1 is an elevational view, partially in section of one embodiment of a gas filtration system of the present invention as applied to an incinerator for an apartment building or the like.

FIG. 12 is a perspective view partially broken away of the booster burner assembly forming a portion of the gas filtration system of FIG. 1.

DESCRIPTION OF THE PREFERRED EMBODIMENT

Figures 1, 12:
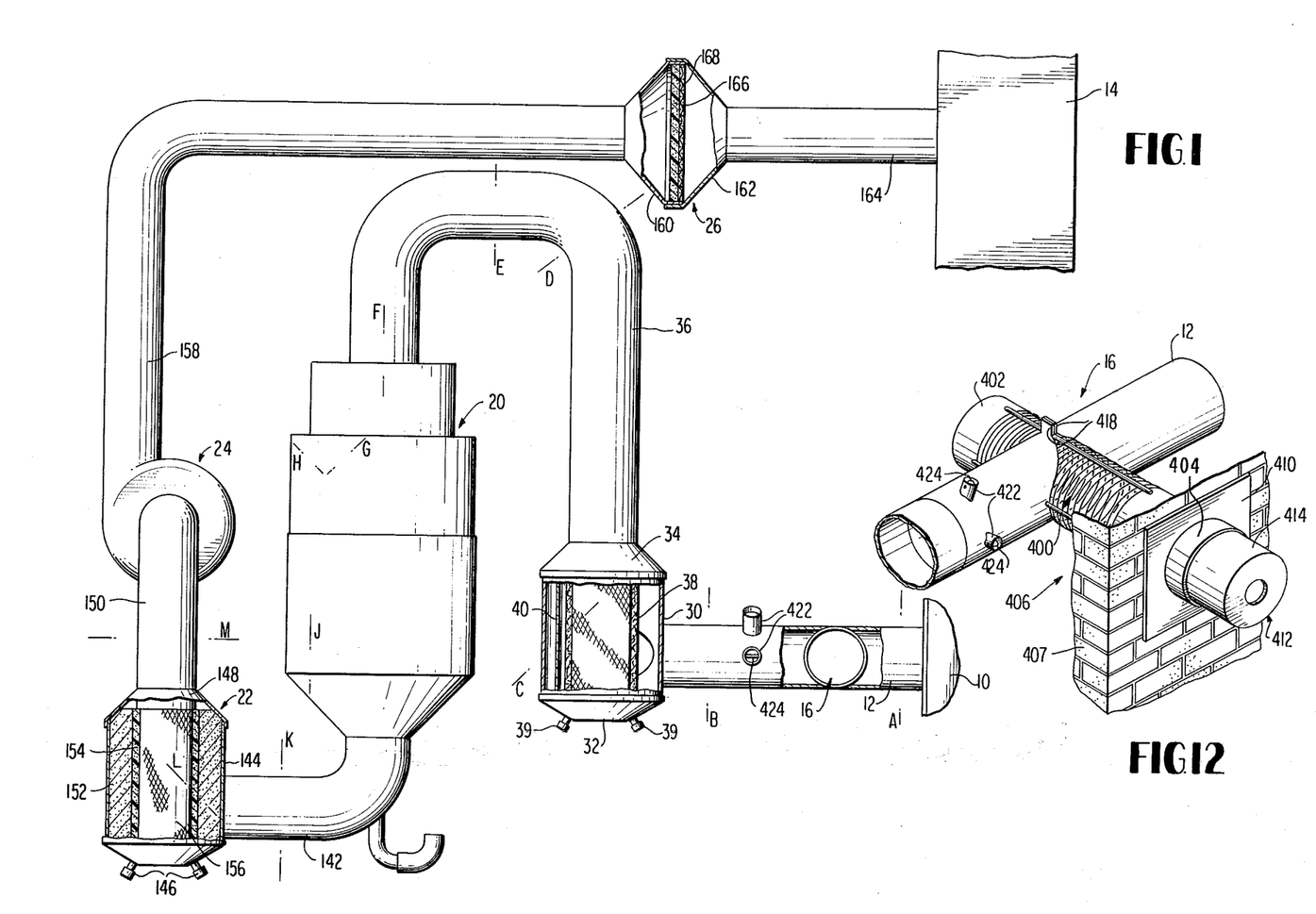

Turning to FIG. 1, the gas filtration system of the present invention in one form, is applied to an incinerator associated with an industrial plant of relatively small size, a commercial building such as an office building, or an apartment house, permitting the incinerator to operate under national air purification laws. As such, the system is installed between the incinerator indicated generally in block form at 10 connected to the inlet side of pipe 12 leading indirectly to the flue or stack 14 associated with the building or industrial complex with which the gas filtration system of the present invention has application. In the present system, there may be advantageously associated with the gas filtration means, a booster burner assembly 16 which is coupled to pipe 12 intermediate of its ends. The booster burner is essentially a gas fueled burner which insures, to a greater degree, the combustion of any particulate matter emanating from the incinerator 10 which is unburned or partially burned prior to entering the remaining system components. Downstream of booster burner assembly 16, are essentially a coarse filter 18, a main, fluidized filter indicated generally at 20, a de-odorizing filter 22, a fan or blower 24 on the downstream side of the main fluidized filter 20 and a final filter or dust remover 26 intermediate of blower 24 and flue or stack 14.

FIG. 12 illustrates perspectively and by partially being broken away, the booster burner assembly 16 of the present invention in terms of its employment with the gas filtration system of the embodiment of FIG. 1. Essentially, there is provided an elongated cylindrical assembly mounted within a combustion chamber 406 defined by brickwork 407 which intersects, at right angles, the duct 12 connecting the incinerator 10 to the coarse filter 18. In this regard, the booster burner assembly is characterized by a burner gun which causes flame to extend angularly relative to the axis of the cylindrical assembly 16 and pass through the narrow gap existing between the turns or loops of a steel coil 400 which extends coaxially between imperforate cylinder sections or sleeves 402 and 404 on either side of duct 12, FIG. 12. The flame passes radially therefore, beyond the confines of the coil 400 and, as indicated, any particulate matter of a size in excess of one-eighth of an inch or the like which is the spacing or gap between the individual loops or turns 408 of the coil 400, due to the intense heat of combustion, is burned up prior to passage from right to left through the coil 400 and at right angles to the coil axis. The mounting plate 410 permits the booster assembly to be statically mounted relative to the combustion chamber 406. The cylindrical sleeve 404 permits slidable mounting of the concentrically received cylindrical burner gun casing 414 for the burner gun 412. Thus, the flame of the burner gun can be shifted axially within sleeve 404 to center the flame with the axis of duct 12 carrying the gas to be treated and intersecting sleeve 404. A plurality of longitudinally extending rods or like supports 416 are circumferentially spaced about the steel coil 400 extending from sleeve 402 to sleeve 404. Duct 12 constitutes essentially two sections which are connected together by means of connecting flanges 418 by being bolted together or welded together at this point. The air and fuel supplied to the burner gun are not shown but are of conventional nature.

Immediately downstream of the booster burner assembly 16, are provided a plurality of circumferentailly spaced cooling air intake tubes 422, each carrying a disc-like control flap 424. Flaps 424 are mounted for pivoting at right angles to the axis of the tubes 422 and permit the mixture of cooling air with the high temperature gas stream emanating from the booster burner assembly. This reduces the temperature of the gases prior to impingement with the various filters downstream of the booster burner assembly. The high intensity flame heats the combustion gas to temperatures of 1200° F. or greater in order to insure burning of any particulate matter carried by the same which is unburned and, further, in order to kill organic odors. This is particularly necessary in the incineration of low combustible matter. The present invention is therefore directed to the application of a forced flame which is either gas or light liquid fuel, across the gas stream to be filtered, thus forcing the gases to pass twice through the flame which is cylindrical at the point of intersection with duct 12. Impingement of the gas, both on the right and left hand sides, passes through the steel coil 400, instantaneously kills the odors without necessarily high fuel consumption. Even though the temperature of the flame may be in excess of 2400° F., the gas temperature itself is raised only slightly due to its instantaneous contact with the flame and immediate passage downstream to the coarse filter 18. With respect to the burner gun 14, it is to be noted that any commercially manufactured, flange mounted type of gas or light liquid, fuel burner will accomplish the desired result. Further, due to the telescoping nature of casing 414 within the cylindrical casing or sleeve 404 which carries flange 410, this permits the axial adjustment of the burner gun relative to the right angle axis of the intersected duct 12, thus the flame may be correctly set in terms of the axis of the gas flow to be treated which passes at right angles therethrough. Burner output for regular operation (set for combustion of garbage type A under U.S. Specifications) is approximately 200,000 B. T. U. per hour for each 1,000 c.f.m. of gas to be treated. The output of the burner should therefore be set at a minimum of 400,000 B. T. U. ground level for the first 1,000 c.f.m. and 200,000 B. T. U. per hour being added for each additional 1,000 c.f.m. of gas to be treated depending upon the fluctuation in the gases treated by the filtration system. A conventional burner classified as 2.5 g.p.h. and having a nozzle angled between 60° and 70°, insures that the flame shoots through the gas and between the spiral turns of coil 400 to perform adequately.

Turning to the coarse filter 18, the duct 12 at its discharge end, opens up tangentially into a cylindrical filter cavity 28, defined by an imperforate cylindrical wall 30 which is closed at its lower end by a cap 32 and which at its open end is coupled, through a frustroconical pipe 34, to a U-shaped pipe 36. The coarse filter comprises essentially an annular glass mat sleeve 38 which constitutes a static cylindrical filter formed of intermeshed glass fibers which act essentially to remove particles carried within the parts of combustion discharging from incinerator 10 of a size in excess of 100 microns. Gap 32 is removable both to facilitate replacement of the annular glass mats screen 38. Any particulate matter captured between the outside of screen 38 and the interior of annular wall 30 may be removed through drain pipe 39. In order to direct the air flow relative to the filter, arcuate baffle 40 is employed to separate the gas stream and insure impingement of the gas stream equally about the periphery of the annular glass mat coarse filter 38. Essentially, gas, now relieved of its larger contaminant particles exits from the coarse filter 18 through the center of screen 38 and enters the axially aligned pipe 36 where it is directed to the intake side of the main, fluidized filter 20.

Figure 2:
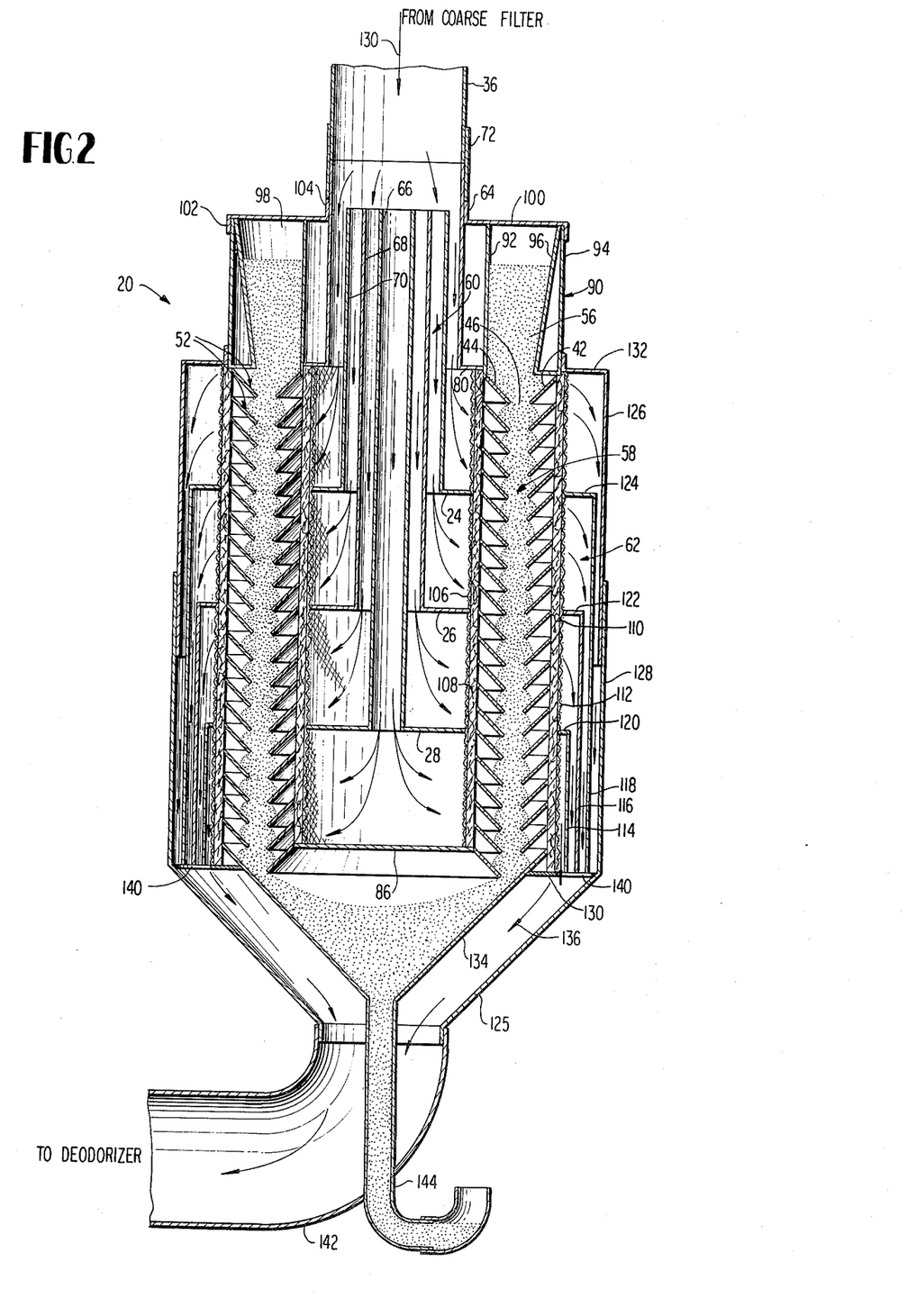
FIG. 2 is a sectional, elevational view of the improved fluidized filter of the present invention, forming a part of the filtration system of the present invention.
Figures 3, 4:
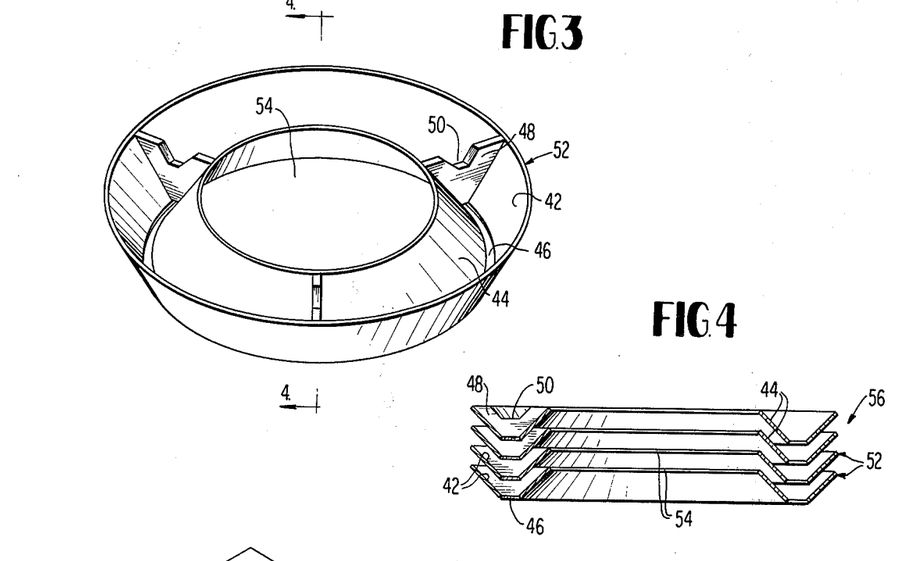
FIG. 3 is a perspective view of one of the annular louver sets forming a principal component of the filter of FIG. 2.
FIG. 4 is a sectional view taken about lines 4—4 of FIG. 3 of a stack of the annular louver sets of FIG. 3, employed in the filter of FIG. 2.

The main, fluidized filter 20 forms the principal component of the gas filtration system of the present invention and in the embodiment is essentially annular in form. Further reference may be had to FIGS. 2–4 inclusive for a better understanding of the structure of fluidized filter 20 of the present invention and the operation of the same. Filter 20 is constructed of circular shaped parts which can be expanded lengthwise to filter increasingly large gas flow by the simple expedient of adding louvers sets in terms of the axial array and extend the body which is telescopic, which carries the same. In this way, the main fluidized filter is capable of handling any gas volumes (the minimum 4,000 c.f.m. size being expandable up to 15,000 c.f.m. in the illustrated embodiment). Turning to FIG. 3, the fluidized filter 20 is formed of a series of stacked annular louver sets 52 consisting of an annular outlet louver 42 which inclines downwardly and inwardly and a smaller diameter inlet louver 44 which inclines downwardly and outwardly to define a small annular gap 46 therebetween. The intake and outlet louvers 42 and 44 respectively are inclined at 45° relative to the axis of the set. Preferably, three circumferentially spaced V-shaped carriers 48 are welded, along respective sides, to the individual frusto-conical louvers and, in turn, the upper edge of each carrier carries a modified V-shaped recess 50 which, in fact, receives in nested fashion, the converging ends of the louvers 42 and 44 of the next succeeding louver set. In addition to the annular opening 46 between the louver blades 42 and 44, there are provided circular openings 54 at the center of each set defined by the inner rim of each of the intake louvers 44. The louver sets therefore are piled on top of each other in a spaced, vertically extending array, FIG. 2, to form an essentially cylindrical particulate filter media screen or column, the gas intake being to the inside of the column and the gas outlet to the outside. The fluidized screen is defined by the particulate matter 56 which is captured between the louvers of the cylindrical array, or column. Essentially, therefore, each main fluidized filter 20 comprises the annular filter column 58, the inlet gas distribution assembly 60, is concentrically positioned internally of the fluidized filter screen 58, while the gas outlet disperser or assembly 62 concentrically surrounds filter screen 58. The inlet gas distribution assembly 60 comprises a plurality of concentric tubes 66, 68 and 70 which are telescopic such that the upper ends of the tubes are at the same level. They lie essentially just below the termination of pipe 36, within inlet tubing or pipe 64 which is of the same size as pipe 36 and essentially acts as a continuation of the same. In that respect, a coupling sleeve 72 concentrically surrounds the abutting pipes 36 and 64 and overlap both to form an essentially sealed joint permitting some axial shifting of the inlet tubing 64 with respect to pipe 36 emanating from the coarse filter 18. Pipes 66, 68 and 70 are of decreasing lengths and increasing diameters in that order, and leave spaces between each other, so that certain portions of the total gas flow pass relatively between these pipes. The pipes cooperate with circular baffle plates 74, 76 and 78 along with the lip 80 of inlet tubing 64 and imperforate circular plate 86, to divert the gas 90° to the direction of entry, into the vertical array or column of louver sets and through the annular fluidized screen 58 defined by the particulate matter 56 captured between the louvers. Particulate matter 56 defining the filter media comprises, preferably, chrome ore of 125 to 1500 microns in size. As the filter expands to accommodate an increase in gas volume, the number of the distributor tubes may be increased, or the distance between baffles 74, 76 and 78 extended to insure continued uniform distribution of the gas to the fluidized filter media or particulate matter 56.

Associated with the inlet gas distribution assembly 60, is the media tank indicated generally at 90. Tank 90 is formed by an inner cylindrical tube 92 which is welded to the top intake louver 44 or otherwise attached. The tank is further defined by an outer cylindrical tube 94 and a frusto-conical annular member 96 whose upper edge is essentially of the same diameter as outer tube 94 while its inner, bottom edge corresponds generally to the inner rim of the uppermost discharge or outlet louver 40. These parts are welded to the top exhaust or outlet louver 42 to form a sturdy unit capable of withstanding the weight of the filtration material 56 stored therein for further distribution through the annular space 46 defined by the opposed edges of the opposite directed intake and exhaust louvers 44 and 42 respectively. Preferably, four vertical, circumferentially spaced partitions 98 are carried by the media tank 90 to insure equal flow of filtration media in the form of particulate matter 56 all around the cylindrical filter 20 and to form a uniform screen 58. An annular lid 100 covers the top of the media tank with a downwardly turned rim 102 at the outside overlying the upper edge of tube 94, while upturned rim 104 at the inner edge surrounds the inlet tubing 64. Interspersed in concentric fashion between the intake gas distributor assembly 60 and the fluidized filter column or screen 58 is an inner wire mesh sleeve or cylinder 106 extending the full axial length of the screen 58 and an immediately adjacent, slightly larger diameter glass mat sleeve 108 constituting non-woven glass fibers and being approximately two inches in thickness. Similarly, adjacent to the outside of the exhaust louvers 42, there is provided a second glass mat sleeve 110 which is concentrically disposed about the outside of the louver column and in contact therewith and surrounding the same is a second wire mesh cylinder or sleeve 112. The glass mat sleeves and the meshed cylinders cooperate on both the intake and exhaust sides of the louver column to prevent the fluidized media 56 from leaving the filter column except by discharge at the bottom of the column after saturation by the solid particles carried by the gas and performing the particle removing filtration function. Further, glass mat sleeves filter out any particles 100 microns or more in size which, for some reason, fail to separate at the coarse filter 18.

In similar fashion to the intake gas distributor assembly 60, the outlet gas disperser assembly 62 comprises a plurality of drums or tubes of various size. Concentric drums 114, 116 and 118 of increasing length and increasing diameter, in that order, act in conjunction with baffle rings or plates 120, 122 and 124 respectively, which extend radially inwardly from said drums or tubes and are essentially coplanar with the circular baffle plates or rings 78, 76 and 74 respectively, associated with the intake gas distributor 60 to control gas flow at the discharge side of the filter. The tube or drum diameters act in conjunction with their length as to insure equalized gas flows to the collection or gas outlet, 142 at the bottom of the fluidized filter 20. The inner edges of the rings 120, 122 and 124 contact the wire mesh cylinder 112 and the rings act in conjunction with drums 114, 116 and 118 to define the flow path along the upper and lower body shells 126 and 128 which are relatively slidable in telescopic form to permit extension and/or retraction of the fluidized filter dependent upon the number of annular filter sets 52 required to adequately remove the particulate matter carried by the gas stream entering pipe 36 in the direction of arrows 130. The upper body shell 126 has a rim 132 on the top that tightly fits around the outer tube 94 of media tank 90, allowing this portion of the filter to be opened by simply lifting the upper body shell 126 relative to the lower body shell 128. The lower shell in turn has its upper part fitting tightly but slidable therewith.

Outer cone 125 forms a gas collection area with discharge cone 134, that is, it defines therebetween, a converging annular passage 136. An annular perforated plate 130 is welded to the lower body shell 128 and the lower louver set 52 of the column rests upon the same. Plate 130 is provided with a series of apertures 140 to permit the passage of gas therethrough to passage 136 and for discharge into pipe 142 acting as the outlet of the main fluidized filter 20. In turn, the particulate matter discharge cone 134 terminates at a relatively small diameter fluidized material drain pipe 144 which projects from the filter discharge pipe 142 to permit the selective removal of particulate matter 56 after micron size particle contamination of the same within the louver column.

In this embodiment, it is evident from the above description, that the capacity of the filter 20 may be readily expanded since the overlapping upper shell 126 and lower body shell 128 may be axially extended permitting additional louver sets 52 to be inserted into the body itself, thus expanding the cylindrical filter screen 58. If this is insufficient, an intermediate tubular element (not shown) may connect the upper and lower shells of the body fitting into the upper shell 126 and over the lower shell 128 and in this way, the unit can be expanded to any reasonable size to keep the intake velocity and discharge gas velocity at the filter screen 58 below 5 feet per second which prevents disturbing of the filter media 56.

Referring again to FIG. 1, after leaving the fluidized filter 20, the gas (now removed of its solid contaminants of size in excess of 40 microns) passes next to a cylindrical de-odorizing filter 22, which is constructed essentially the same as the coarse filter 18 in terms of the metal shell or casing and also in terms of configuration and size, but incorporates a slightly different filter media within the same. Pipe 142 terminates at one side of the cylindrical body shell or casing 144 identical in all respects to casing 30, the casing 144 carrying an oval side opening to permit tangential entry of the gas into the interior of the de-odorizing filter 22. A lower lid or cover 146 identical to element 32 of the coarse filter 18 acts in conjunction with the outlet cone 148 to complete an imperforate container, with the outlet pipe or discharge tube 150, extending coaxially from the center of the outlet cone 148. A glass mat sleeve 154 identical to sleeve 38 of filter 181 is carried within the cavity defined by shell 144 and concentrically positioned about the sleeve 154, is a cylindrical mass 152 of activated charcoal, filling the space between casing 144 and sleeve 154. A cylindrical wire mesh screen 156 stabilizes sleeve 154. The gas stream which enters tangentially into the de-odorizer filter 22 passes in a spiral manner through the charcoal 152, the glass mat screen 154 and the wire mesh screen 156 and exits through pipe or tubing 150.

It is at this point that a conventional blower or fan 24 is provided within the system for suction movement of the gas stream from the incinerator 10 in sequence through the booster burner assembly 16, the coarse filter 18, the fluidized filter 20 and the de-odorizer filter 22. Essentially solid particles in excess of 100 microns carried by the products of combustion from the incinerator 10 are removed by the coarse filter 18, most of the remaining particles of 100 microns or larger being removed by the fluidized filter 20, and particles of 20 microns or greater, are removed by the de-odorizing filter 22, prior to any of the gas contacting the fan or blower blades. In this way, there is minimum abrasion and the blower or fan life is greatly increased. Further, filters 18, 20 and 22 also remove to a great extent, chemicals which would adversely attack the metal fan or blower blade. Blower or fan 24 is conventional, preferably of a centrifugal nature and discharging the gas through tubing or pipe 158 which leads to the final dust remover 26. The dust remover 26 consists essentially of opposed inlet and outlet cones, the cones being fixed to each other at their large diameter ends by overlapping edges which act to hold a polyurethane foam disc which spans the cavity defined by the cones while the small diameter end of each of the cones are respectively connected to pipe 158, leading from the fan or blower 20 and pipe leading to the stack 14. A metal screen 168 extends across the cavity defined by the cone to one side and in contact with the polyurethane disc, preferably on the downstream side to support the same and to prevent distortion to the polyurethane foam disc by the impinging gases on the opposite side. If necessary, a second metal screen of identical mesh size may be positioned on the opposite side of the disc for maintaining the same in position. In the illustrated embodiment for an apartment house incinerator system or the like, the foam disc 166 may be approximately two inches in thickness. The two inch thick polyurethane foam disc acts as a final dust or particle remover and capturing particles of 20 microns size or larger, thus permitting the gas to exit into the stack 14, essentially pollution free, having removed 99.5 percentage of the pollutants by means of filters 18, 20, 22 and 26. With the exception of the material forming the glass mat sleeves, the polyurethane foam sleeves of the filters 18, 20 and 22, the polyurethane disc of the filter 26, the particulate matter 56 forming the fluidized filter zone 88, and the activated charcoal 152, the components of the system are all formed of sheet metal. The individual metal elements making up the components, may be welded together, bolted or riveted under conventional fabrication techniques. Preferably, the particulate matter 56 making up the fluidized filter bed of filter 20, comprises chrome ore of 125 to 1500 micron size but depending upon the particle size of the gases being scrubbed, this material may readily vary, both in size and content. Further, it is preferred that the filter media have sharp edges. For instance, instead of chrome ore, the particulate matter 58 may comprise crushed granite or the like or other sharp edged crystalline material, depending upon whether the system is employed in conjunction with incinerators, for commercial, office or apartment buildings, or the system is employed to treat industrial flue gases or gases resulting as by-products from industrial processes.

Turning to FIGS. 5–9 inclusive, there is illustrated another embodiment of the improved fluidized filter of the present invention, particularly useful in conjunction with the treatment of industrial flue gas. Instead of being constructed of circular or cylindrical components, the fluidized filter 200 is generally of modified rectangular form constituted by a casing consisting of flat, spaced, parallel side walls 202, flat end walls 204 and a flat rectangular cover 206. The side walls 202 join at their bottom edges converging oblique side walls 208 to which is coupled a generally semi-cylindrical bottom casing 210. The side walls are coupled by means of mutually engaging flanges 212. Further, the gas to be filtered enters one end of the casing through parallel intake or inlet pipes 214 and exits through a single offset but longitudinally parallel discharge pipe 216, the flow indicated by arrows in FIG. 5.

Figure 5:
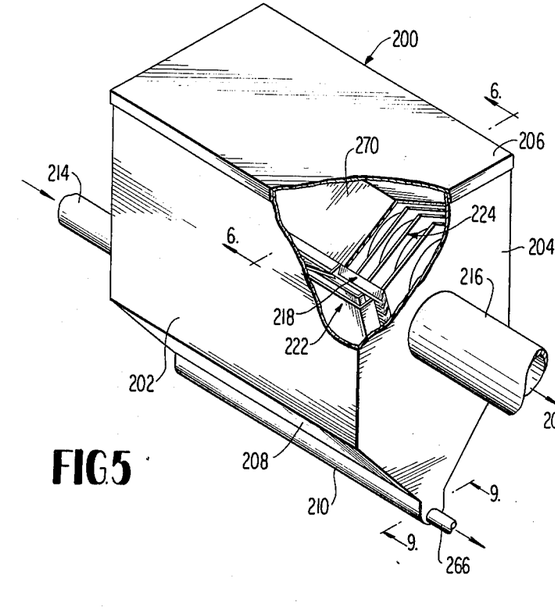
FIG. 5 is a perspective view, partially broken away, of an alternate embodiment of improved fluidized filter of the present invention.
Figure 6:
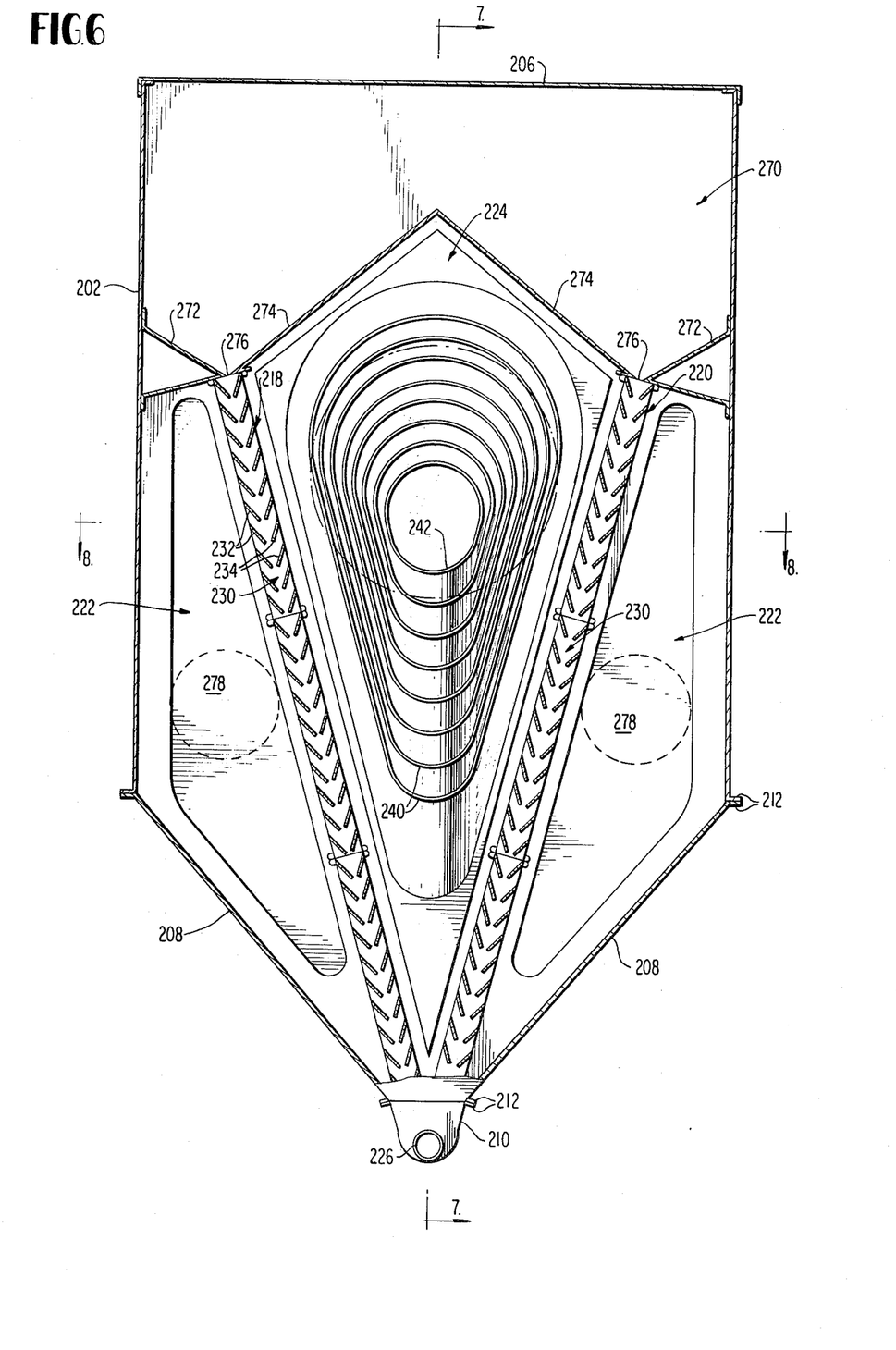
FIG. 6 is a sectional, elevational view of the filter illustrated in FIG. 5 taken about line 6—6.
Figure 7:
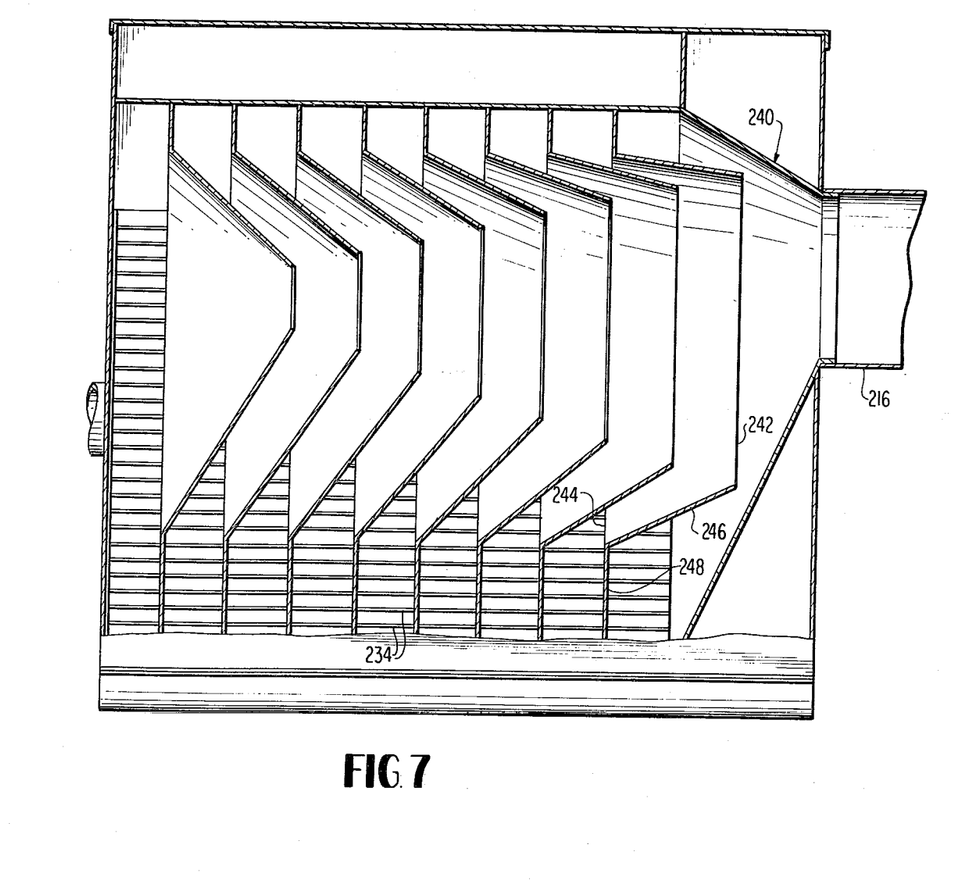
FIG. 7 is a sectional, elevational view of the filter illustrated in FIG. 6 taken about line 7—7.
Figure 8:
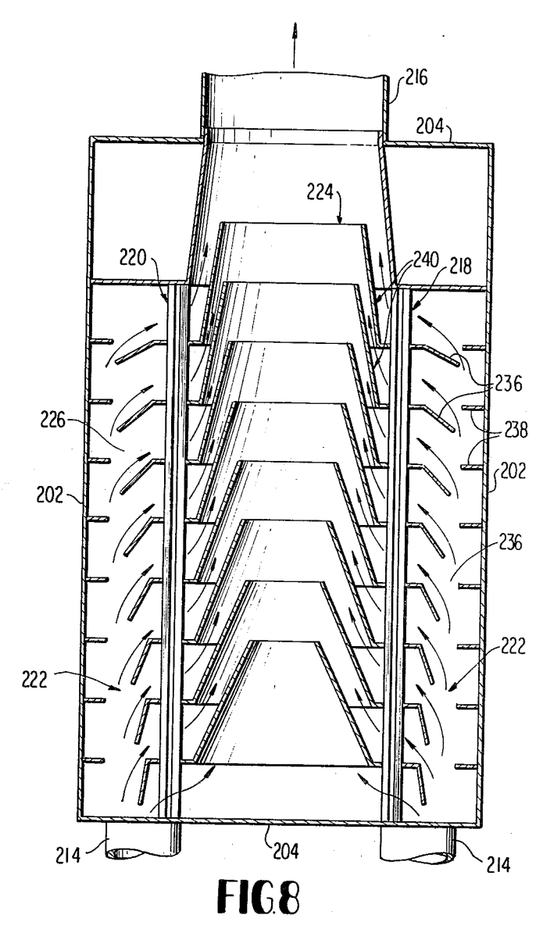
FIG. 8 is a horizontal sectional view of the filter of FIG. 6 taken about line 8—8.
Figure 9:
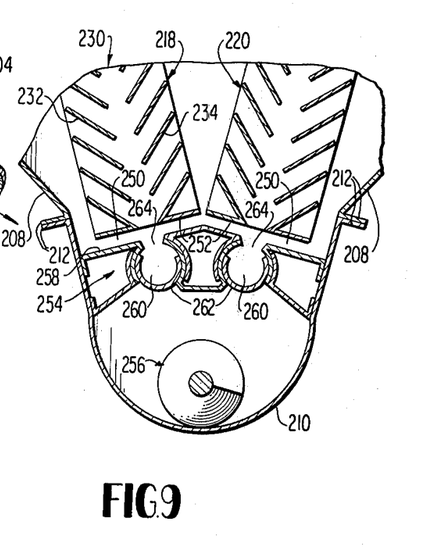
FIG. 9 is an enlarged, sectional view of a portion of the filter shown in FIG. 5, taken about line 9—9.

Further, as seen in FIGS. 5, 6 and 9 the intake and discharge louvers are not annular in form but are flat and extend longitudinally within the casing defining stacked louver sets or arrays 218 and 220 at the left and right respectively, looking in from the discharge end of the filter. The stacked louver sets are inclined from the vertical to the left and right respectively of the centerline. The inclination of the louvers forms an important function in terms of increasing the efficiency of the fluidized filter screen when acting in conjunction with each inlet gas distribution assembly to the outside of respective louver arrays and the outlet gas disperser assembly lying intermediate of louver arrays 218 and 230. The intake pipes 214 terminate at the left hand end wall 204, FIG. 5, with the gas passing into inlet gas distribution cavities 226 defined in respective cases by end walls 204, side walls 202 and 208, and louver arrays 218 and 220. As in the fluidized filter 20 of the first embodiment, it is necessary to maintain low velocity passage of the gas across the fluidized filter screen 230 defined by the particulate material or filter media supported within gaps between the individual inlet and discharge louvers 232 and 234 for each louver set as well as to insure that essentially the same volume of gas passes through all areas of the fluidized filter screen. This is achieved in the illustrated embodiment by means of vertically extending baffles 236 for each of the inlet gas distribution assemblies 222. Baffles 236 have terminal portions which are bent to a greater or lesser degree with respect to the longitudinal flow axis of the filter to more or less deflect the incoming gases from a longitudinal to a transverse flow direction. The baffles 236 extend only part way across the inlet gas distribution chambers 226 and act in conjunction with fixed transversely extending baffles 238 which are in spaced alignment therewith. Further, in collecting the gases for distribution in relatively contaminant free condition, after passage through the fluidized filter screens 230, the outlet disperser 224 is formed by a plurality of longitudinally spaced partitions or baffles as at 240, each constituting, in cross section, a central frusto-conical portion 246 having an enlarged diameter inlet opening 242 and a reduced diameter discharge opening 244 and being connected by flanges to the upwardly and outwardly tapering side walls of the opposed louver arrays and at right angles to the axis of the filter. The tapered central passage of each of the baffles 240 are nested, one within the other in a downstream direction with the center sections being of enlarged size in the same direction, to maintain proper flow distribution in terms of directing the gas after filtering, on the discharge side of the fluidized filter screens 230, to the discharge conduit 216. For a given baffle 240, the discharge opening 242 is essentially smaller than the intake opening 244 as defined by the juncture between the frusto-conical center portion 246 and its flange portion 248 as evidenced best in FIG. 7, which constitutes an elevational sectional view of this portion of the filter. The manner in which the baffles 240 act in conjunction with the various discharge louvers 230 and the sizing and angulation of the same to maintain uniform flow distribution and gas velocity through the various sections of the fluidized filter screens 230 between respective louvers 232 and 234 for each of the louver arrays 218 and 220, can be readily visualized by reference to FIGS. 5–9 inclusive and, in particular, FIG. 6. Note in particular, the manner in which the louver sets are joined in each array, that is, end to end. To increase the surface area of the fluidized zone one merely stacks one section upon another in a vertically inclined fashion. The bottom ends 250 of the lowermost section, FIG. 9, are welded together as at 252, and are slightly spaced from rotary valve assembly 254, which controls the flow of particulate screen material (not shown) similar to that at 56 in the embodiment of FIG. 2, to the bottom of the casing section 210. A rotary screw 256 acts as a longitudinal conveyor for accumulated filter media. Essentially, each of the valves 254 comprise fixed partitions 258 defining a cylindrical valve cavity 260 which carries a semi-cylindrical tube 262, which are relatively rotatably and sealably positioned therein. The semicylindrical tubes 262 are mounted for rotation about their axes which extend parallel to the longitudinal axis of the filter and operates such that by rotation approximately 90° from the position shown, the particulate filter material may readily flow through the openings 264 of the partition members 258. Because of the corresponding longitudinal slots 266 within the tubular members 262, this permits ready discharge of the pulverized particulate matter defining the fluidized screen 230 into the area occupied by the conveyor screw 256 for discharge axially as indicated by the arrow 267, FIG. 5, at the end of a filter material collection tube 268. Particulate matter is carried within a large bin 270 formed by internal walls 272 and 274 which incline relative to each other and define openings 276 for each of the louver arrays 218 and 220, permitting the particulate matter to fall between the louvers 232 and 234, resting upon the same and effectively forming a permeable fluid particle filter screen 230 for the gases entering the filter through intake openings 278 at the end of inlet tubes 214.

In addition to the employment of fluidized filtration screens in which the gas to be filtered is evenly distributed over the complete screen at relatively low velocity and thus obtaining maximum efficiency in filtration with high contamination removal, the angular inclination of the filter arrays permits the outlet gas, which is expanding in volume and therefore has its velocity reduced, to move essentially vertically upwards through the filter media, thus effecting by gravity, deposition of the contaminant solid particles carried by the gas in the voids between the particulate matter forming the fluidized filtration screen 230. Further, since any possibility of blow out of the filter media in terms of its particulate matter by gas flow at the discharge side of the filter louvers also must be at the expense of gravity, that is, in an essentially vertical, upward movement, this reduces the possibility, even at relatively high gas velocities.

Figure 10:
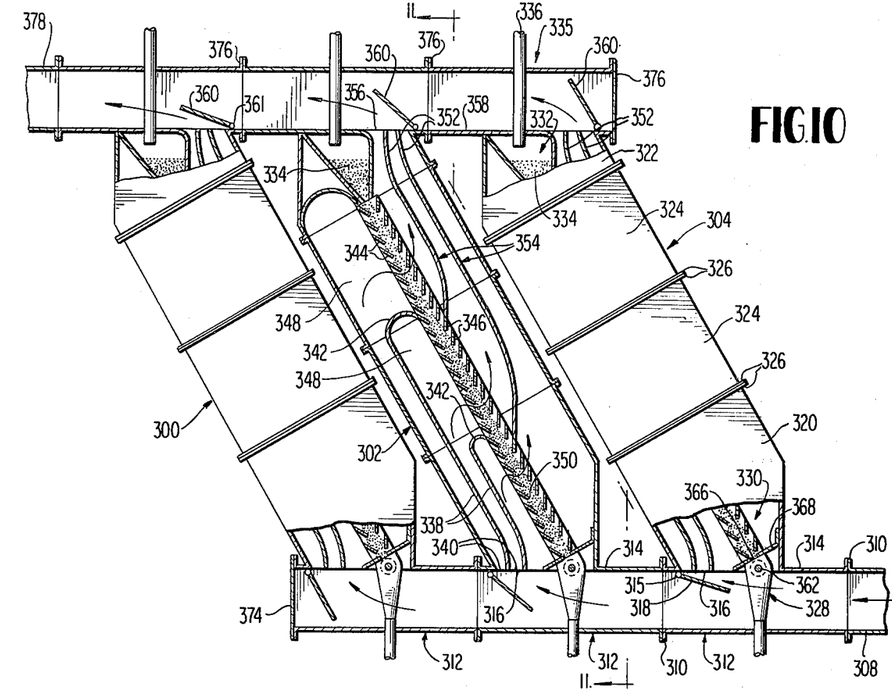
FIG. 10 is an elevational view, partially broken away, of a third embodiment of the improved modular fluidized filter of the present invention illustrating its use as modular components of a multiple filter system.
Figure 11:
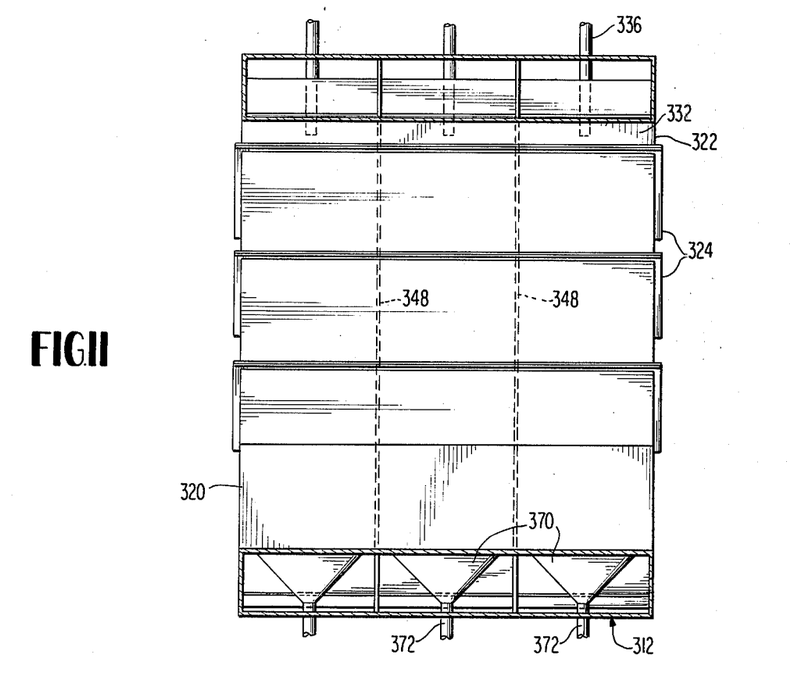
FIG. 11 is a sectional elevational view, of the fluidized filter assembly of FIG. 10, taken about line 11—11.

Turning next to FIGS. 10 and 11, the modular approach to constructing the highly efficient fluidized filter of the present invention is perhaps best seen in the embodiment of FIGS. 10 and 11. Such an arrangement has particular application to industrial systems since a plurality of individual fluidized filters as at 300, 302 and 304, are essentially stacked, side by side, in a horizontally extending array with parallel flow paths and wherein for each of the filters 300, 302 and 304, the lower arrays are oriented in an upwardly, inclined direction so as to insure that the gases passing through the discharge or outlet louvers of each filter move essentially vertically for the improved operation discussed previously with respect to the second illustrated embodiment of the present invention.

The modular approach may be seen from FIG. 10 in which an inlet duct 308 has coupled to it, by flange connections as at 310, intake ducts or pipe sections 312 of identical size and configuration for each of the three filters 300, 302 and 304. The piping constitutes essentially of rectangular ducts wherein the upper panel or wall 314 for each filter is provided with a transversely extending, rectangular opening 316 which is partially closed off by means of a door 318 mounted for pivoting about a horizontal pivot axis 315 to the extent necessary to control the volume of gas entering each of the filters 300, 302 and 304. The doors are inclined to a greater extent with respect to the horizontal in a direction away from the inlet side of the system, so that essentially identical volumes of the gas to be treated pass through each one of the filters, regardless of whether there are two filters, three filters or more in an array. Further, each one of the filters is constituted by an inlet section 320 and a discharge section 322 which are generally similar in configuration but reversed, and a plurality of rectangular intermediate sections 324 which are end to end coupled together by means of flanges 326. While two intermediate sections are shown, each of the filters may include three, four, five or more axially joined intermediate sections 324 greatly extending the height of the filter array and its capacity but maintaining essentially three parallel filter units. The top and bottom sections 320 and 322 of each of the filters are individually characterized by the fact that the bottom section includes filter media collection and discharge cones 328 associated with the discharge end of the louver array 330 carried by the bottom sections. Each section 322 is provided with a filter media supply bin indicated generally at 332. Bin 332 is supplied with particulate material 334 by means of a tubing 336 which passes through its exhaust duct section 335 and connects the media tank 332 with a feed mechanism (not shown). The individual louver arrays 330 may be essentially the same in configuration and construction to the louver arrays 218 and 220 of the embodiment of FIG. 5. Further, it is important to note that in addition to providing a series of hooklike baffles as at 338 having ends 340 terminating coplanar with the opening 316 in the upper wall 314 of the respective duct sections 312 and curved or hooked ends 342 which terminate adjacent a given intake louver 344 of the louver array 330, a plurality of transversely spaced partitions 348 are provided for each of the filter sections 320, 322 and 324 tending to further insure uniform flow distribution of the gases over the surface of the fluidized screen, partitions 348 extending fully across the intake and discharge sides of the filters. Again, the partitions 348 and baffles 338 are spaced from each other to define flow paths for the incoming gases which limit portions of the gas to the bottom filter section 320 or a given intermediate filter section 324. Essentially, the upper section 322 is merely a coupling means which acts to form the media tank 332 and to carry the initial leading ends 352 of the discharge baffles 354 which controls the flow to the cleaned gas common collecting ducts 334 on the discharge side of the filter array. In that respect, the ends 352 of the discharge baffles 354 terminate commonly at the rectangular opening 356 within the bottom wall 358 of each of the discharge duct sections 335. Furhter, doors 360 are maintained at varying inclined positions relative to their horizontal pivot axis 361 to a degree opposite that of the corresponding intake dust doors 318 associated with intake duct sections 312, to properly control and maintain uniform flow over the complete surface area of the fluidized filter screens 350.

The control of the particulate filter material or media 334 and the renewal of the same after contamination by the particles removed from the gas is essentially identical to that of the embodiment of FIG. 5, each of the fluid media collection means 328 incorporating a rotary valve 362 for permitting controlled flow of the particulate matter 334 through opening 366 within a mounting plate 368 at the bottom of the lowermost filter set. Again, each filter media collection cone 328 terminates at a vertical pipe 372, permitting controlled discharge of the filter media after contamination for disposal or recycling. End plates 374 and 376 overlie the ends of the most downstream intake duct section 312 and the most upstream oulet duct section 335, respectively, the outlet duct sections being coupled together by flanged connections 376 and finally to an outlet pipe 378 leading to the stack (not shown).

By stacking the intermediate filter units 324 upon each other and by increasing the number of parallel flow paths defined by the individual filters as at 300, 302 and 304, the filter array may be adjusted to handle various gas flows. The filters are formed of modular sections and end to end coupled. The individual sections such as 322, 324, 320, 322 and 324 as well as the intake and discharge ducts, sections 312 and 334 may be readily broken down, and dismantled and re-assembled upon the spot. Further, each of the units 320, 322, 324, 312 and 330 may be prefabricated remote from the erection site and mass produced for selective assembly depending upon the gas volumes to be treated.

Regardless of the rectangular or circular configuration of the parts making up the illustrated systems, which are essentially formed of sheet metal, the fluidized filtration system may be manufactured or assembled in terms of the square footing of filter screen area to meet the load specifications on a job by job basis. Since the units are either telescopic in form or constructed of modular sections added by end to end coupling, the present invention has application to an infinitesimal variety of commercial, industrial and housing needs. Further, because of the particular care in insuring uniform inlet gas distribution and controlled outlet gas collection, in conjunction with the inclination of the louver sets in certain embodiments, high gas velocities may be tolerated, even where the particulate matter forming the filtration zone is relatively small in size and light in weight without blow off of the particulate filter material from the discharge louvers.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A gas filtration system for treating the products of combustion intermediate of the source and a stack discharging the same comprising:
    means downstream of the source for subjecting the products of combustion to high intensity flame,
    a plurality of series connected filters coupled to said high intensity flame producing means downstream thereof,
    at least one of said filters comprising a plurality of sets of spaced, oppositely inclined louvers, converging in a downstream direction, with the louvers of each set being laterally spaced and supporting therebetween an essentially continuous screen of filter particulate material,
    means defining intake and discharge ducts on respective sides of said louvers for delivering gas under pressure to said louver sets and removing treated gas therefrom,
    axially and transversely directed baffle members on the intake and discharge sides of respective louvers for insuring uniform gas flow at uniform velocity through said particulate filter material screen,
    and wherein said louvers comprise axially spaced, paired inner and outer annular rings with opposed rings defining louver sets and said baffle members comprise an internal set of spaced, concentric tubes whose diameters vary inversely with their length and having intake ends lying in a common plane and having flanges directed radially outwardly therefrom in a transverse direction at their discharge ends with the flange peripheries juxtaposed to said intake louvers and an external set of concentric tubes whose diameters vary directly with their length and having their discharge ends in a common plane and carrying internally directed transverse flanges at their opposite ends with the peripheries of the same terminating in juxtaposed position to the outer peripheries of said outer rings.

2. The gas filtration system as claimed in claim 1, wherein said discharge duct constitutes a pair of telescopic cylindrical shells, whereby additional louver sets may be accommodated by extending one shell relative to the other.

3. The gas filtration system as claimed in claim 1, wherein at least two of said other filters comprise identical, cylindrical casings having intake openings in the periphery of the same permitting tangential delivery of the gas to be treated internally of said cylindrical casings, semi-cylindrical baffle means positioned within said casings and directing gas flow spirally towards the center of said casings, a as discharge opening carried at one end of said cylindrical casings, at least one cylindrical wire screen concentrically positioned within said casings interiorly of said semi-cylindrical baffle means and a sleeve of porous fiber glass material, concentrically positioned and in surface contact with said wire mesh screen, the porosity of said fiber glass sleeve being such as to prevent passing of solid particulate matter carried by said gas in sizes in excess of one hundred microns for passing therethrough.

4. The gas filtration system as claimed in claim 3, further comprising an annular mass of activated charcoal concentrically carried within one of said other cylindrical casings and intermediate of said casing and said glass fiber sleeve for removing the odors from the gas stream flowing therethrough.

5. The gas filtration system as claimed in claim 1, wherein imperforated duct means connected said source to the first filter of said series and wherein said means for subjecting the products of combustion to high intensity flame comprises a metal wire coil intersecting said duct means at generally right angles to the same and passing through the center of the same and a fuel burner coupled at one end to said coil and providing a radially expanding flame partially extending exteriorly of said coil and impinging on the products of combustion passing through said coil at the point of intersection of said coil with said duct means.

6. The gas filtration system as claimed in claim 5, wherein a pair of imperforate cylindrical sleeves are fixed to respective ends of said coil, reinforcing rods extend between said sleeves to maintain said sleeves in longitudinally spaced positions and wherein said fuel burner comprises a cylindrical assembly concentrically received within and slidable relative to one of said sleeves permitting longitudinal adjustment of said flame relative to said wire coil.

7. The gas filtration system as claimed in claim 6 further comprising at least one cooling tube carried by said duct means downstream of said high intensity flame for cooling said gas prior to contacting said first filter of said series.

* * * * *